United States Patent [19]

Kinoshita et al.

[11] Patent Number: 4,897,732
[45] Date of Patent: Jan. 30, 1990

[54] ELECTRONIC CAMERA

[75] Inventors: Takao Kinoshita; Yoshiyuki Takishima, both of Kawasaki, Japan

[73] Assignee: Canon Kabushiki Kaisha, Tokyo, Japan

[21] Appl. No.: 54,591

[22] PCT Filed: Sep. 13, 1986

[86] PCT No.: PCT/JP86/00477
§ 371 Date: May 12, 1987
§ 102(e) Date: May 12, 1987

[30] Foreign Application Priority Data

Sep. 13, 1985 [JP] Japan ................. 60-201743

[51] Int. Cl.⁴ .................... H04N 5/76; H04N 5/782
[52] U.S. Cl. ................... 358/335; 358/906; 360/10.11
[58] Field of Search ............ 358/335, 229, 312, 906; 360/10.1, 33.1

[56] References Cited

U.S. PATENT DOCUMENTS 4,604,668  8/1986  Lemelson ............... 358/335 X
4,691,253  9/1987  Silver .................. 358/335 X

FOREIGN PATENT DOCUMENTS 57-44374    3/1982  Japan.
58-182964  10/1983  Japan.
58-218004  12/1983  Japan.

Primary Examiner—L. T. Hix
Assistant Examiner—D. Rutledge
Attorney, Agent, or Firm—Fitzpatrick, Cella, Harper & Scinto

[57] ABSTRACT

An electronic camera electronically records an optical image by using a memory and includes an image pickup element, an image pickup section, and an external recording section. The image pickup section includes a small capacity memory for recording at least one-frame image signals supplied from the image pickup element. The external recording section includes a memory and a recording head. The external recording section is detachable from the image pickup section.

11 Claims, 9 Drawing Sheets (a)

$V_D$ (VERTICAL SYNC)

(b)

ELECTRONIC CAMERA

FIELD OF INDUSTRIAL APPLICATION

The present invention relates to an electronic camera, that is, a camera for electronically recording an optical image and, more particularly, to an electronic camera having a recording section using a non solid-state memory, such as a disk, as a recording means.

BACKGROUND OF THE INVENTION

A conventional electronic camera of this type consists of an image pickup section for converting an optical image into an electrical signal and a disk recording section for electronically or magnetically recording the electrical signal.

Alternatively, an electronic camera of this type has a solid-state memory, instead of a disk recording section, as the recording means, in order to eliminate a drawback.

However, the devices as described above have the following drawbacks.

First, an electronic camera having a disk recording section as a recording means has the following drawbacks:

(1) Since a recording disk and a disk drive for driving the same have predetermined sizes, miniaturization of the entire camera is limited.

(2) A predetermined time interval is required for the rise time of disk rotation when recording of an image is started, and a shutter release opportunity can be lost.

(3) The power consumption required for the disk servo is comparatively large, and disk servo time not contributing to recording is prolonged.

(4) The camera housing must be water- and dust-proofed for the necessity of a disk change, resulting in a high cost.

Meanwhile, an electronic camera using a solid-state memory as a recording means has the following drawbacks:

(1) It is difficult to increase the memory capacity above a predetermined degree, and the maximum number of photographing frames is smaller than that of an electronic camera which uses a disk.

(2) Since cost reduction of the memory is limited, reduction in photographing cost is also limited.

(3) A semiconductor memory requires power to maintain data of a recorded optical image, and it is difficult to reserve it permanently.

(4) If a replaceable memory pack is used to overcome the problem of the limited maximum number of photographing frames, the camera housing must be water- and dust-proofed, resulting in a high cost.

SUMMARY OF THE INVENTION

Therefore, according to the present invention, an image pickup section including an image pickup element and a solid-state memory means for recording at least one-frame of image signals from the image pickup element, and an external recording section including a non solid-state memory means are provided separately, and the image pickup section and the external recording section are detachable.

BRIEF DESCRIPTION OF THE DRAWINGS

Embodiments of the present invention will be described in detail with reference to the accompanying drawings.

DETAILED DESCRIPTION OF THE PREFERRED EMBODIMENTS

Figure 1:
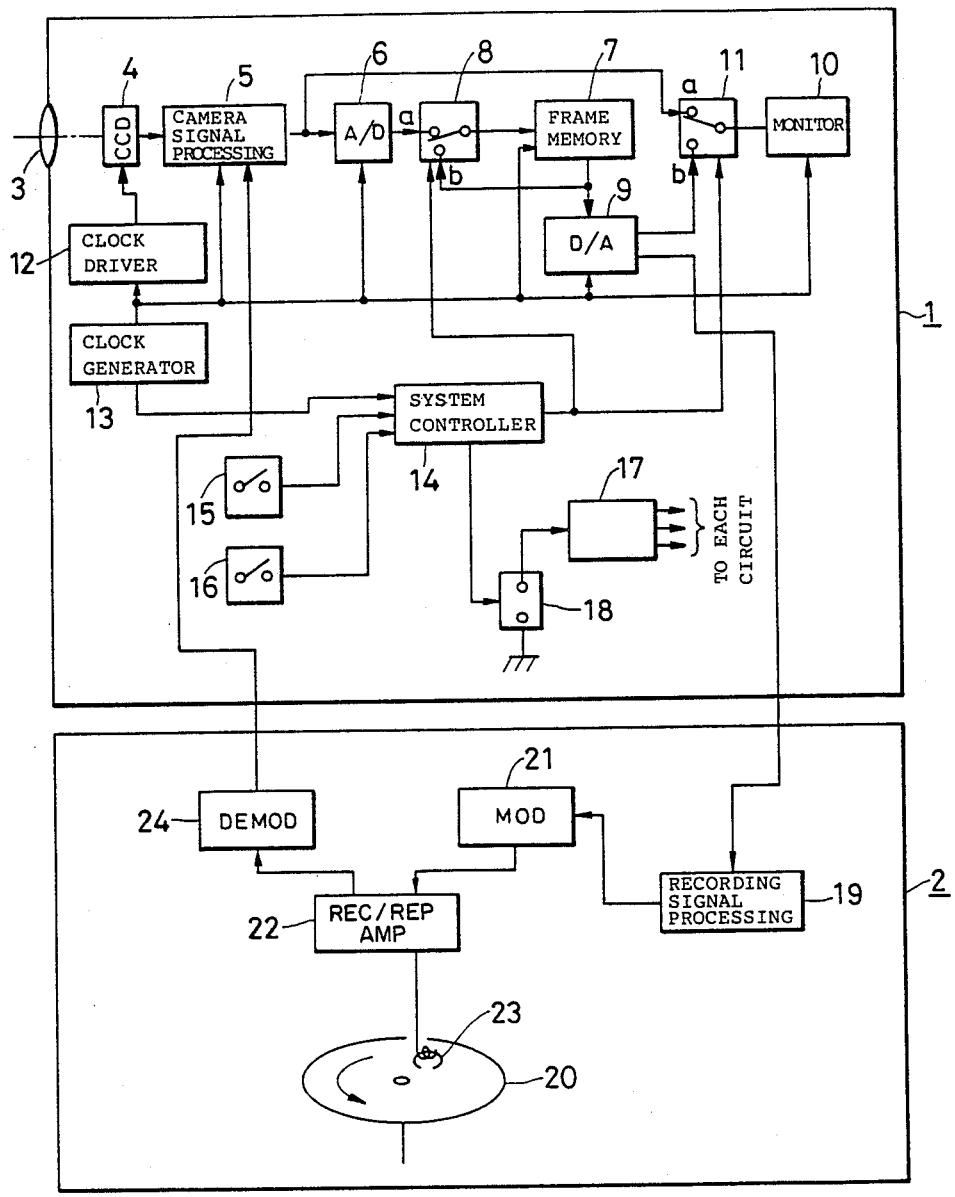
FIG. 1 is a block diagram of a first embodiment of the present invention.

FIG. 1 is a block diagram of an arrangement of an electronic camera according to an embodiment of the present invention.

The electronic camera of this embodiment basically comprises of an image pickup section 1 and a disk recording section 2.

The image pickup section 1 has a lens 3 and an image pickup element 4. The image pickup element 4 forms an optical image from the lens 3 and converts the optical image into an electrical signal, i.e., an image signal. The image pickup element 4 comprises a known image pickup means such as a CCD, a MOS, an image pickup tube and so on. A signal processing circuit 5 processes the image signal from the image pickup element.

The image pickup section 1 also has an A/D converter 6 and a frame memory 7 for storing one-frame digital image signals supplied from the A/D converter. The frame memory 7 can be a field memory if needed. A nonvolatile DRAM is suitable as the frame memory 7. Therefore, a selection switch 8 is provided between the A/D converter 6 and the frame memory 7. When the frame memory 7 sequentially records incoming image signals, a contact a of the selection switch 8 is turned on. When a recording signal must be maintained, a contact b of the selection switch 8 is turned on. A recording signal is switched in this manner.

A D/A converter 9 converts a digital image signal read out from the frame memory 7 into an analog signal.

A monitor 10 displays an image signal as a visual image.

A second selection switch 11 is also provided. When a contact a of the second selection switch 11 is turned on, raw image signals obtained by the image pickup element 4 and sequentially supplied via the signal processing circuit 5 are supplied to the monitor 10 and displayed on it. In this case, the monitor 10 serves as a finder of the camera.

On the other hand, when a contact b of the second selection switch 11 is turned on, the image signal of the frame memory 7 is supplied to the monitor 10 via the D/A converter 9 and displayed on the monitor 10.

A clock driver 12 supplies a clock pulse from a clock generator 13 to the image pickup element 4, the signal processing circuit 5, the A/D converter 6, the frame memory 7, the D/A converter 9, the monitor 10, and so on. The respective units of the image pickup section 1 are driven in accordance with the clock pulse.

A system controller 14 controls switching of the contacts of the selection switch 8 and the second selection switch 11 in accordance with the timing obtained by a release switch 15. The system controller 14 is also driven by a clock signal from the clock generator 13.

A main switch 16 controls start/stop of the system controller.

A power source 17 and a power source switch 18 are provided. Power from the power source 17 is supplied to the respective units of the image pickup section 1 and the disk recording section 2.

The disk recording section 2 has a recording signal processing circuit 19. The recording signal processing circuit 19 performs signal processing in order to supply an analog signal, obtained by converting an image signal on the frame memory 7 by the D/A converter, to a recording disk to be described later.

The disk recording section 2 has a recording disk 20. The recording disk 20 uses a magnetic sheet as a disk medium. Another medium such as an optical recording medium and a photomagnetic recording medium can also be used.

An FM modulator 21 modulates an analog image signal from the D/A converter 9 into an FM signal and supplies the FM signal to the recording disk 20 when a recording disk is used as a magnetic medium.

A recording/reproduction amplifier 22 is used to amplify a signal when the signal is to be recorded on the magnetic disk 20 or when a signal described later is reproduced.

When a signal is recorded, a digital image signal can be recorded without being converted into an analog signal by the D/A converter 9. In this case, a signal to be recorded does not pass through the D/A converter 9 but is directly supplied to the disk recording section 2.

When a digital signal is directly recorded on the recording disk 20, the recording signal processing circuit 19 performs a signal processing necessary for processing a DC component in the signal. In this case, the FM modulator 21 can be omitted. When a digital image signal is recorded, better image quality is obtained while the entire camera is simplified compared to a case wherein an analog image signal is recorded.

A recording/reproduction head 23 is used to record and reproduce a signal on and from the recording disk 20.

An FM demodulator 24 demodulates an FM reproduction signal supplied from the recording/reproduction amplifier 22. An analog image signal output from the FM demodulator 24 is supplied to the camera signal processing circuit 5 of the image pickup section 1. Therefore, the signal reproduced from the recording disk 20 can be displayed on the monitor 10 is the same manner as an image signal from the image pickup element 4.

Figure 2:
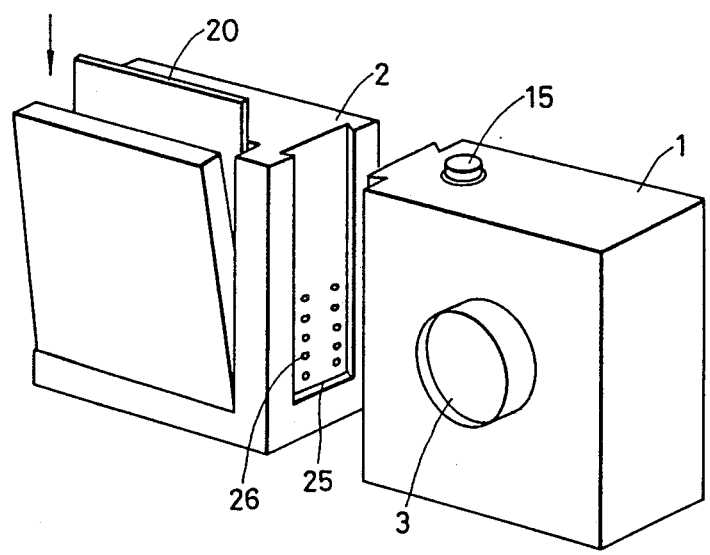
FIG. 2 shows an outer appearance of the first embodiment.

FIG. 2 shows an outer apparatus of the electronic camera of the present invention. The same reference numerals are used to denote the same portions as in the block diagram of FIG. 1.

Referring to FIG. 2, a joint 25 includes a contact group 26 for electrically connecting the image pickup section 1 and the disk recording section 2.

With the above arrangement, the electronic camera of the present invention operates in the following manner.

Figure 3:
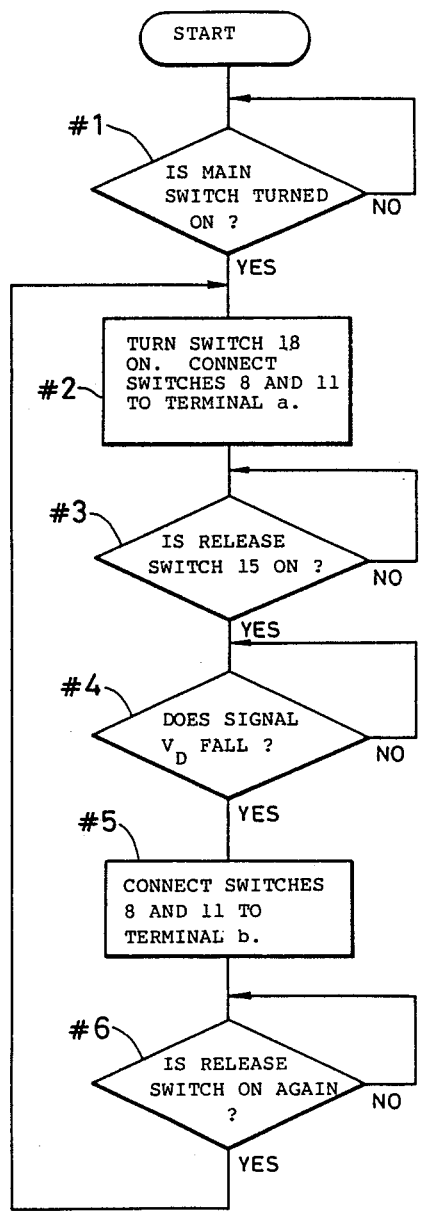
FIG. 3 shows a flow chart and a waveform chart of the operation of the first embodiment.
Figure 3:
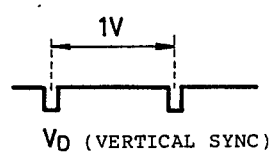

The operation of the camera of the present invention will be described with reference to the flow chart shown in FIG. 3(a).

In step #1, the main switch 16 is turned on, and the system controller 14 is enabled.

In step #2, the power source switch 18 is turned on, and the contacts a of the selection switch 8 and the second selection switch 11 are turned on. Then, power is supplied from the power source 17 to the respective portions to actuate them.

In this case, when an external optical image is projected on the image pickup element 4 through the lens 3, the image is converted into an electrical image signal, and the image signal is supplied to the monitor 10 through the contact a of the second selection switch 11 and displayed on the screen of the monitor 10. In other words, in this case the monitor 10 serves as the finder of the camera.

Meanwhile, the system controller 14 generates a sync signal by a clock signal supplied from the clock generator 13. A vertical sync signal VD is generated every one frame period V, as shown in FIG. 3(b).

When the frame memory 7 is a field memory, the vertical sync signal VD is generated at a period of $\frac{1}{2}$V.

Then, the flow advances to step #3 to turn on the release switch 15. The system controller 14 is driven and the vertical sync signal VD is supplied to the selection switch 8 and the second selection switch 11. When the vertical sync signal VD falls (step #4), the selection switch 8 and the second selection switch 11 are switched to their contacts b (step #5). Then, the signal data on the frame memory 7 is connected through the contacts b, the image is fixed, and a so-called image freeze state is obtained. The frozen image is supplied to the monitor 10 through the contact b of the second selection switch 11 and displayed on it.

At the same time, the frozen image is also supplied to the disk recording section 2 through the D/A converter 9. The one-frame frozen image is recorded on the recording disk 20.

When a next image is to be picked up, the release switch 15 is depressed again (step #6), and the flow returns to the state after step #1. When the release switch 15 is turned on again, the operations as described above are sequentially performed, and the next image is recorded on the recording disk 20.

The frame memory 7 has a small memory capacity of a limited number of frame. However, if the memory capacity is greatly increased in the near future, images of several tens of frames or more can be recorded.

In the camera of this embodiment, since an image recorded on the recording disk 20 can also be displayed on the monitor 10 via the signal processing circuit 5, an image once stored in the recording disk 20 can be visually observed.

In this embodiment, the electronic camera has the separate image pickup section 1 and disk recording section 2, as described above. After an image signal is temporarily stored in the frame memory 7, the image signal is transferred to the disk recording section 2. Therefore, a shutter release opportunity may not be lost due to a delay in starting timing of the recording disk 20. The image pickup section 1 can be made small and lightweight. When peak power is decreased to decrease the power source load on the image pickup section 1, a signal is read out from the image pickup element 4 at a low speed and temporarily stored in the frame memory 7. Therefore, the number of photographing frames can be increased than in a conventional electronic camera even with a cell of the same capacity. Once an image is stored in the frame memory, the image pickup section 1 is connected to the disk recording section 2, and the image can be transferred from the frame memory 7 to the recording disk 20 at a normal speed.

The content of the frame memory 7 can be reproduced and displayed on the monitor 10 through the D/A converter 9. When a given image is an unnecessary image, the corresponding memory area of the recording disk 20 can store a new image.

Figure 4:
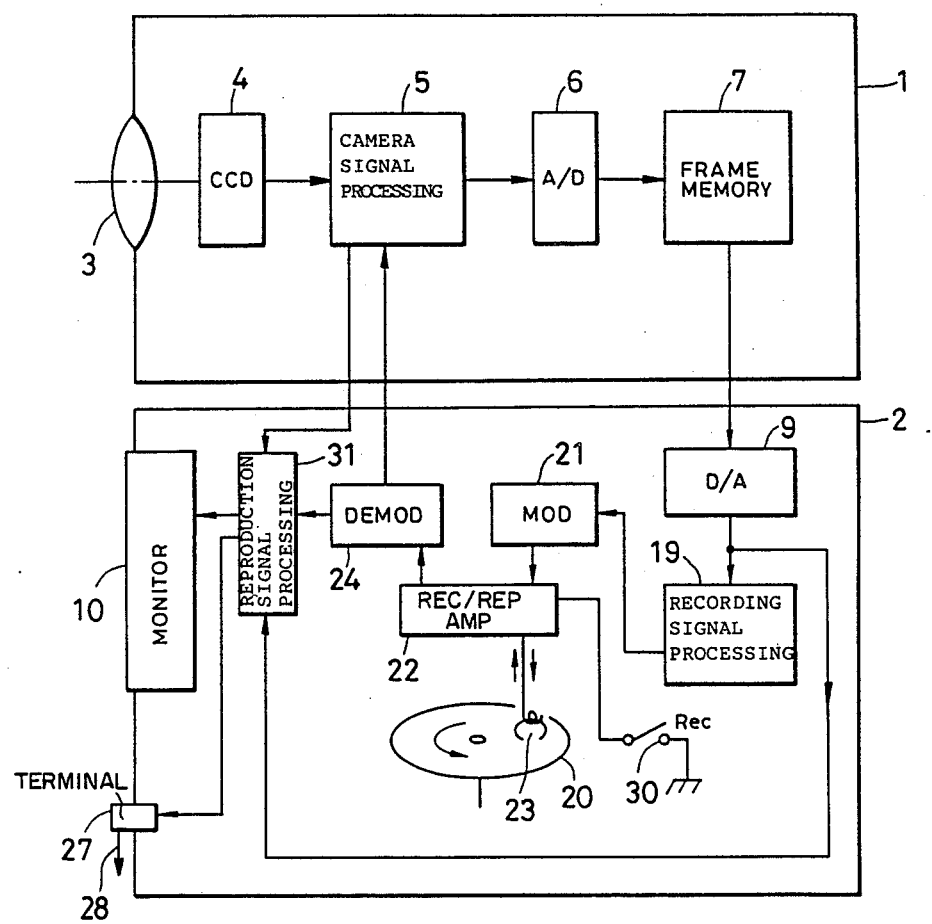
FIG. 4 is a block diagram of a second embodiment of the present invention.

FIG. 4 shows a second embodiment of the present invention. In FIG. 4, the portions denoted with the same reference numerals as in FIG. 1 operate in the same manner as the first embodiment and a detailed description therefor is omitted. Some necessary circuits shown in detail in FIG. 1 are not shown in FIG. 4. However, an image pickup section 1 has the same arrangement and operation as those of the first embodiment.

Figure 5:
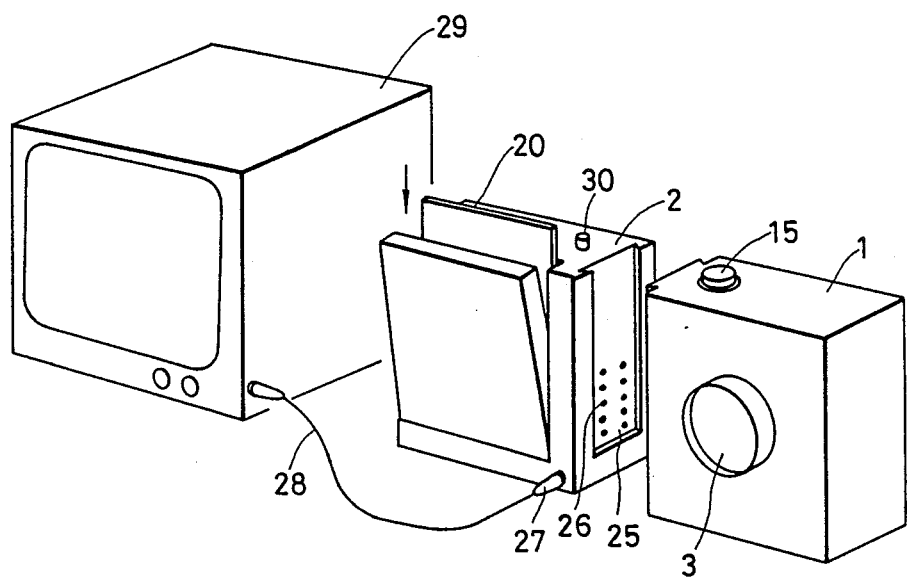
FIG. 5 shows an outer appearance of the second embodiment.

FIG. 5 shows an outer appearance of the second embodiment. Referring to FIGS. 4 and 5, an output terminal 27 for supplying an image signal to outside transmits, through a cable 28, an image signal displayed on the monitor 10 and displays it on a television monitor 29.

A switch 30 controls start of a recording/reproduction amplifier 22. The switch 30 is used to determine whether an image on a frame memory 7 of the image pickup section 1 is recorded on the disk 20. When the switch 30 is lightly depressed, a current image is not recorded on the disk 20 but a next image on the frame memory 7 is transferred. When the switch 30 is strongly depressed, a current image on the frame memory 7 is transferred, and both the frame memory 7 and the recording disk 20 can pickup and record a new image. The operation is shifted in this manner.

When the image pickup section 1 and the disk recording section 2 are connected, the content of the frame memory 7 of the image pickup section can be automatically and sequentially transferred at once. In this case, it is easy to increase the number of recording frames of the frame memory 7 and to display these frames. The connection of the image pickup section 1 and the disk recording section 2 is shown. They can be connected through a wire or without a wire.

In this embodiment, the monitor 10 is provided in the disk recording section 2.

A reproduction signal processing circuit 31 receives a reproduction signal from an FM demodulator 24, an image signal on the frame memory 7 supplied from a D/A converter 9, and an input image signal supplied from an image pickup element 4 through a signal processor 5, and supplies them to the monitor 10 and the output terminal 27.

A third embodiment of the present invention will be described with reference to FIGS. 6 and 7.

Figure 6:
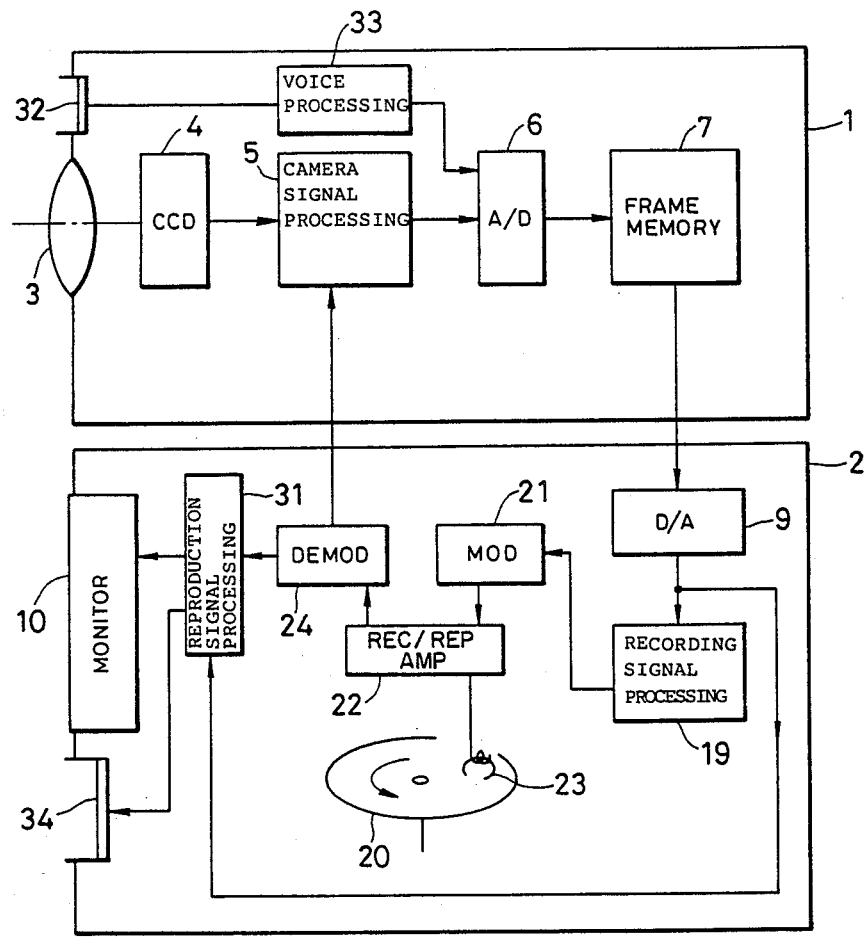
FIG. 6 is a block diagram of a third embodiment of the present invention.
Figure 7:
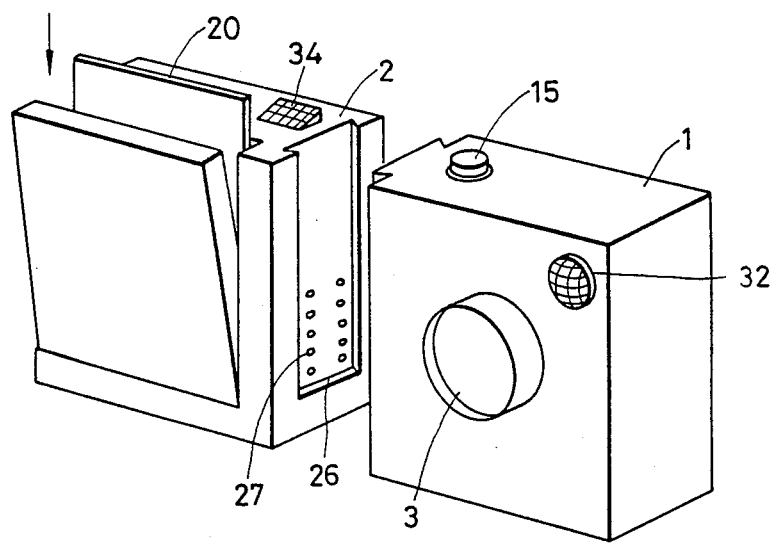
FIG. 7 shows an outer appearance of the third embodiment.

In FIGS. 6 and 7, the portions denoted with the same reference numerals as the first embodiment are identical to those therein, and a detailed description therefor is omitted.

FIG. 6 is a block diagram of the third embodiment, and FIG. 7 shows an outer appearance of the same.

Referring to FIGS. 6 and 7, a microphone 32 and a voice processing circuit 33 are provided. The voice processing circuit 33 processes a voice signal from the microphone 32 by time base compression or the like.

A loudspeaker 34 reproduces a voice signal. In this embodiment, a voice signal as well as an image signal can be recorded.

More specifically, a voice signal picked up by the microphone 32 is time-base compressed by the voice processing circuit 33 into a time-base compression voice signal having the same frequency band as that of an image signal supplied from an image pickup element 4.

A time-base compression voice signal is short and has the same data amount as that of a longer voice signal. This signal is converted into a digital signal by A/D converter 6 and recorded on frame memory 7.

The time-base compression signal is then transferred onto the recording disk 20 in the same manner as for an image signal.

When a signal is reproduced, it is derived as a time-base compression voice signal by the FM demodulator 24 in the same manner as an image signal, time-base expanded to a voice signal of a normal frequency band and having a normal time length by the reproduction signal processor 31, and reproduced by the loudspeaker 34.

The microphone 32 and a monitor 10 can be provided to one or both of an image pickup section 1 or a disk recording section 2.

A fourth embodiment of the present invention will be described with reference to FIGS. 8 and 9.

Figure 8:
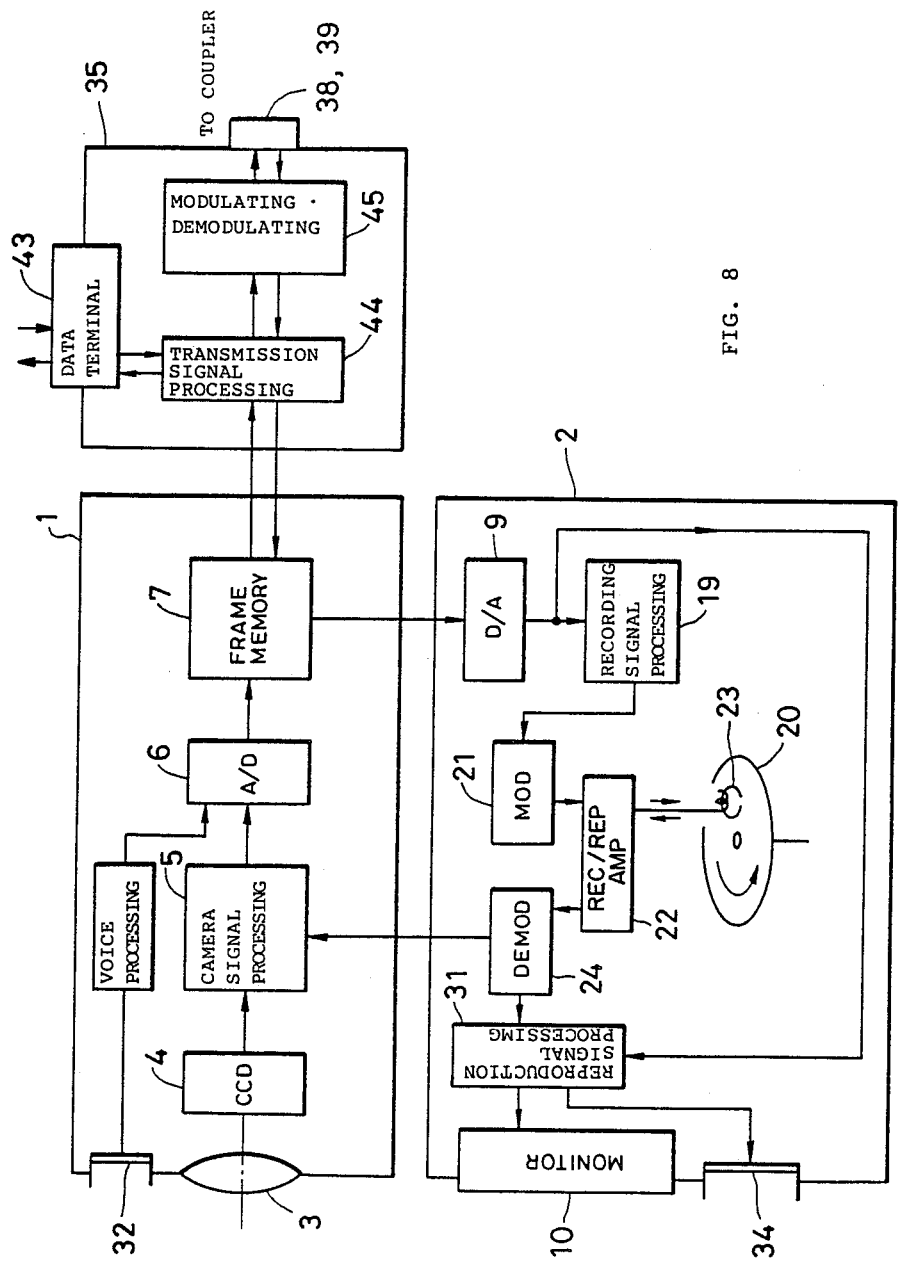
FIG. 8 is a block diagram of a fourth embodiment of the present invention.
Figure 9:
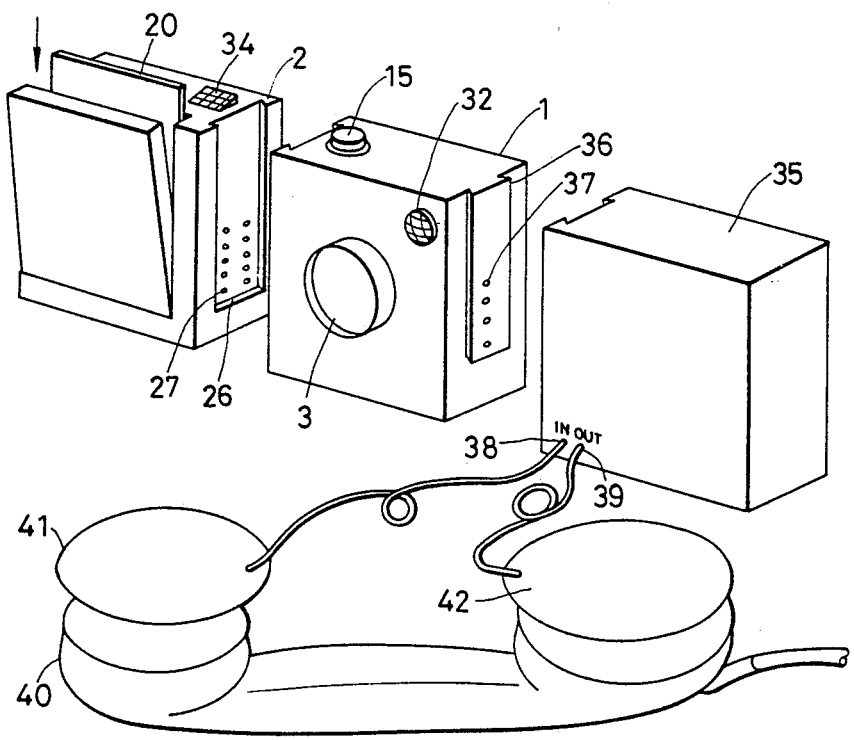
FIG. 9 shows an outer appearance of the fourth embodiment.

FIG. 8 is a block diagram of the fourth embodiment, and FIG. 9 shows an outer appearance of the same. The portions denoted by the same reference numerals are identical to those of other embodiments, and a detailed description therefor is omitted.

A telephone transmission section 35 is provided. A member 36 connects an image pickup section 1 and the telephone transmission section 35. A contact group 37 performs electrical connection.

Terminals 38 and 39 serve as interfaces with a receiver 40 of a telephone set and are connected to voice couplers 41 and 42 opposing the receiver 40.

The telephone transmission section 35 has a data input/output terminal 43. Therefore, a frame memory 7 can be controlled through a transmission signal processing circuit 44, and data of an image signal in the frame memory 7 can be output. The terminal 43 can be a general microcomputer terminal and can be coupled to a microcomputer display, a printer, a disk memory and so on with a known method.

A voice signal from a microphone 32, an image signal from an image pickup element 4, and an image signal and a time-base compression voice signal recorded in the frame memory 7 are modulated by a modulator/demodulator 45 through the transmission signal processing circuit 44, and converted into a carrier which is transmitted via a telephone line through the terminals 38 and 39.

Similarly, when an image signal and a voice signal obtained and picked up at another timing are transmitted through the telephone line, they are input through the terminals 38 and 39, are demodulated by the modulator/demodulator 45 to have the base band, and reach the image pickup section 1 through the transmission signal processing circuit 44. In the image pickup section 1, the signals are transferred on the frame memory 7 and recorded and displayed in the same manner as described above.

In the above embodiment, the image pickup section 1 and the telephone transmission section 35 are connected. However, the same effect can be obtained when a disk recording section 2 and the telephone transmission section 35 are connected.

Note that a solid-state memory performs data accessing or recording/reproduction in a non-mechanical manner and may include a magnetic bubble memory or the like.

A non solid-state memory performs data accessing for recording/reproduction in a mechanical manner and may include a VTR or the like.

As described above, according to the present invention, since an image pickup section having a frame memory and a disk recording section can be separated, the following effects can be obtained:

(1) A camera for picking up an optical image, i.e., an image pickup section can be made small.

(2) Since the non solid-state memory such as a disk is not driven for photographing, a photographing timing is not delayed, i.e., a shutter release opportunity is not lost.

(3) Since the non solid-state memory such as a disk is not driven for photographing, the power consumption can be reduced.

(4) The camera housing can easily be water- and dust-proofed.

(5) Photographing; reproduction, dubbing, and filing of an image or voice; and monitoring of the respective operational steps can be easily performed.

(6) The entire system can be easily extended for voice recording, telephone transmission, and data recording.

We claim:

1. An electronic camera comprising:
   an image pickup section including an image pickup element and memory means, said image pickup section (1) converting an optical image into image signals with said image pickup section, and (2) storing the image signals in said memory means in response to an image pickup operation of said image pickup section; and
   an external recording section detachably coupled to said image pickup section and including a recording member, said external recording section (1) receiving the image signals stored in said memory means in response to the image pickup operation of said image pickup section, and (2) recording the received image signals on said recording member.

2. An electronic camera according to claim 1, wherein said image pickup section has selecting means for transferring an image signal stored in said memory means to said external recording section as needed.

3. An electronic camera according to claim 1, wherein said image pickup section has an A/D converter for recording the image signal stored in said memory means as a digital signal.

4. An electronic camera according to claim 1, wherein said image pickup section has monitor means.

5. An electronic camera according to claim 4, wherein said monitor means can be switched to receive an output from said image pickup element when photographing is performed, and to receive an output from said memory means when signal reproduction is performed.

6. An electronic camera according to claim 1, wherein said image pickup section has voice pickup means, compresses a voice signal from said voice pickup means along a time base, and records the compressed voice signal in said memory means.

7. An electronic camera according to claim 1, wherein said image pickup section has interface means for exchanging image data between said memory means and an external circuit.

8. An electronic camera system comprising:
   (a) a camera unit including,
      (i) image pickup means for converting optical images into electrical signals corresponding to a plurality of image frames, and
      (ii) a memory for storing at least one frame of said electrical signals supplied from said image pickup means in response to an image pickup operation of said camera unit; and
   (b) a recording unit detachably coupled to said camera unit and including a recording member, for (1) receiving said electrical signals stored in said memory in response to the image pickup operation of said camera unit, and (2) recording said received electrical signals on said recording member.

9. An electronic camera system according to claim 8, wherein said memory is a solid-state memory.

10. An electronic camera system according to claim 8, wherein said memory includes a magnetic recording medium.

11. An electronic camera system according to claim 8, wherein said recording member includes a disc shaped recording medium.

* * * * *